(12) United States Patent
Fischer et al.

(10) Patent No.: US 7,057,765 B1
(45) Date of Patent: Jun. 6, 2006

(54) CONSTRAINED MULTI-DIMENSIONAL COLOR TRANSFORMATION

(75) Inventors: Timothy A. Fischer, Mendota Heights, MN (US); William A. Rozzi, Stillwater, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/577,529

(22) Filed: May 24, 2000

Related U.S. Application Data

(60) Provisional application No. 60/136,658, filed on May 28, 1999.

(51) Int. Cl.
*G06F 15/00* (2006.01)
*G03F 3/08* (2006.01)
*G06K 9/00* (2006.01)

(52) U.S. Cl. .................... 358/1.9; 358/518; 382/167
(58) Field of Classification Search ............. 358/1.9, 358/501, 504, 520, 521, 523, 525, 526, 529, 358/530, 534, 536, 539, 518; 382/167, 162; 714/809
See application file for complete search history.

(56) References Cited

U.S. PATENT DOCUMENTS

| 4,500,919 | A | | 2/1985 | Schreiber |
| 4,831,409 | A | | 5/1989 | Tatara et al. |
| 5,231,504 | A | * | 7/1993 | Magee ............ 358/500 |
| 5,339,176 | A | | 8/1994 | Smilansky et al. |
| 5,359,436 | A | | 10/1994 | Dichter et al. |
| 5,363,318 | A | * | 11/1994 | McCauley ............ 702/85 |
| 5,432,906 | A | | 7/1995 | Newman et al. |
| 5,473,736 | A | * | 12/1995 | Young ............ 345/593 |
| 5,526,140 | A | | 6/1996 | Rozzi |
| 5,528,261 | A | * | 6/1996 | Holt et al. ............ 345/604 |
| 5,563,724 | A | * | 10/1996 | Boll et al. ............ 358/502 |
| 5,611,030 | A | * | 3/1997 | Stokes ............ 345/590 |
| 5,724,441 | A | * | 3/1998 | Yoshida ............ 382/166 |
| 5,754,448 | A | | 5/1998 | Edge et al. |
| 5,764,795 | A | | 6/1998 | Takeo et al. |
| 5,812,169 | A | * | 9/1998 | Tai et al. ............ 347/110 |
| 5,835,244 | A | | 11/1998 | Bestmann |

(Continued)

FOREIGN PATENT DOCUMENTS

EP        0 534 871 A2    3/1993

(Continued)

OTHER PUBLICATIONS

Copy of file history for European Patent Application No. 00936285.6-2202, entitled "Constrained Multi-Dimensional Color Transformation," filed May 24, 2000.

(Continued)

*Primary Examiner*—Madeleine AV Nguyen

(57) ABSTRACT

A system and method for multi-dimensional color transformation apply constraints to the transformation function to preserve the presence or absence of particular color information while achieving high accuracy color match. With a constrained multi-dimensional color transformation (CMT), a destination device, such as a color proofer, can provide an accurate color match relative to a source or "target" device, such as a printing press, and preserve dot integrity. In particular, the constraints can preserve selected color information that is present in an image produced by the source device, and prevent addition of other selected color information that would not be present in the source device image. In a halftone imaging device, the constraints prevent the removal or addition of dots from and to the image produced by destination device.

66 Claims, 3 Drawing Sheets

U.S. PATENT DOCUMENTS

| | | | | |
|---|---|---|---|---|
| 5,912,996 A | * | 6/1999 | Melen | 382/317 |
| 6,027,201 A | | 2/2000 | Edge | |
| 6,072,589 A | | 6/2000 | Rozzi | |
| 6,088,038 A | | 7/2000 | Edge et al. | |
| 6,108,442 A | | 8/2000 | Edge et al. | |
| 6,331,899 B1 | * | 12/2001 | Samadani | 358/1.9 |
| 6,362,808 B1 | * | 3/2002 | Edge et al. | 345/601 |
| 6,467,866 B1 | * | 10/2002 | Nagoshi et al. | 347/15 |
| 6,507,666 B1 | * | 1/2003 | De La Torre | 382/167 |
| 6,603,573 B1 | * | 8/2003 | Adler et al. | 358/1.9 |
| 6,608,925 B1 | * | 8/2003 | Edge et al. | 382/162 |
| 2002/0105659 A1 | * | 8/2002 | Rozzi | 358/1.9 |

FOREIGN PATENT DOCUMENTS

| | | |
|---|---|---|
| EP | 0 611 231 B1 | 8/1994 |
| EP | 0 779 736 A2 | 6/1997 |
| GB | 2213674 A | 8/1989 |
| WO | WO 93/20648 | 10/1993 |

OTHER PUBLICATIONS

Copy of file history for International Application No. PCT/US00/14376, entitled "Constrained Multi-Dimensional Color Transformation," filed May 24, 2000.

Copy of first substantive report from the European Patent Office, 11 pages, dated Jul. 19, 2004.

* cited by examiner

CONSTRAINED MULTI-DIMENSIONAL COLOR TRANSFORMATION

This application claims filing date priority from U.S. Provisional Application No. 60/136,658, filed May 28, 1999, the entire content of which is incorporated herein by reference.

TECHNICAL FIELD

The present invention relates to color imaging and, more particularly, to multi-dimensional transformation of color image data.

BACKGROUND

Color imaging devices produce combinations of different colorants to form color images on print media such as paper or film. Many imaging devices make use of combinations of cyan, magenta, yellow, and black (CMYK) to reproduce the gamut of a color image. Ideally, different imaging devices produce identical color output. Differences in hardware and print media, however, can result in substantial variation.

To provide a better colorimetric match, many color management systems execute color transformations. A color transformation manipulates input color data to drive the output of a destination device toward the output of a source device. A color transformation can be applied, for example, to match the output of a color proofing system to that of a printing press.

Common color transformation functions are either one-dimensional (1-D) or multi-dimensional (M-D). A one-dimensional transformation relies on single-input, single-output functions that are applied on a channel-independent basis. In other words, color data for each colorant channel, e.g., C, M, Y, and K, are manipulated independently of other channels to produce a desired visual output.

A multi-dimensional transformation function, in contrast, may specify a mixture of the output colorants for a given input, taking into account interactions between the different colorant channels. For digital color proofing, multi-dimensional functions generally are more effective in achieving a color match between the images produced by the source and destination devices. In this example, the source refers to the device to be matched, e.g., a printing press. The destination refers to the device for which the transformation will be applied, e.g., a digital color proofer.

SUMMARY

The present invention is directed to a system and method for constrained multi-dimensional color transformation, as well as a computer-readable medium containing program code for implementation of such a system and method. The system and method apply constraints to the transformation function to preserve the presence or absence of particular color information while achieving high accuracy color matches. The system and method can be implemented via software executed by a general purpose computer.

With a constrained multi-dimensional color transformation, a destination device, such as a color proofer, can provide an accurate color match relative to a source or "target" device, such as a printing press. In particular, the constraints can preserve selected color information that is present in an image produced by the source device, and prevent addition of other selected color information that would not be present in the source device image.

In a halftone imaging device, the constraints prevent the removal or addition of dots from and to the image produced by the destination device. Use of unconstrained multi-dimensional (M-D) color transformation functions can cause the destination device to produce halftone dots for primary colors that would not be present in a corresponding region of an image produced by the source device. In particular, the unconstrained multi-dimensional transformation can result in substitution and removal of particular colorants in the destination image relative to the colors specified in the source image.

Loss of "dot-integrity" between the source and destination devices limits the effectiveness of the reproduction, particularly when it is used to diagnose color problems in the source device, e.g., during a printing press run. One-dimensional (1-D) transformation functions generally preserve the presence and absence of halftone dots, but provide less accurate color matching than unconstrained M-D transformation functions.

A constrained M-D transform (CMT), in accordance with an embodiment of the present invention, achieves the advantages of both 1-D and M-D transformation functions. Specifically, a CMT preserves the presence and absence of colorants from input to output, and provides more accurate color matching.

Thus, a CMT can provide significantly improved color matching relative to 1-D transformation, and the dot preservation generally unavailable in unconstrained M-D transformation. Indeed, depending on the characteristics of the source and destination devices, the color matching performance of a CMT can approach that of unconstrained M-D transforms.

In one embodiment, the invention provides a multi-dimensional color transformation comprising generating a multi-dimensional color transformation for transformation of a source image to a destination image, and constraining the multi-dimensional color transformation to prevent removal of selected color image data present in the source image.

In another embodiment, the invention provides a method for multi-dimensional color transformation comprising generating a multi-dimensional color transformation for transformation of a source image to a destination image, and constraining the multi-dimensional color transformation to prevent introduction of selected color image data not present in the source image.

In an added embodiment, the invention provides a system for multi-dimensional color transformation comprising a processor that generates a multi-dimensional color transformation for transformation of a source image to a destination image, and a memory that stores constraints, wherein the processor is programmed to apply the constraints to constrain the multi-dimensional color transformation to prevent removal of selected color image data present in the source image.

In a further embodiment, the invention provides a system for multi-dimensional color transformation comprising a processor that generates a multi-dimensional color transformation for transformation of a source image to a destination image, and a memory that stores constraints, wherein the processor is programmed to apply the constraints to constrain the multi-dimensional color transformation to prevent introduction of selected color image data not present in the source image.

In another embodiment, the invention provides a computer-readable medium containing program code that when executed by a processor generates a multi-dimensional color transformation for transformation of a source image to a destination image, and constrains the multi-dimensional color transformation to prevent removal of selected color image data present in the source image.

In a further embodiment, the invention provides a computer-readable medium containing program code that when executed by a processor generates a multi-dimensional color transformation for transformation of a source image to a destination image, and constrains the multi-dimensional color transformation to prevent introduction of selected color image data not present in the source image.

In another embodiment, the invention provides a method for multi-dimensional color transformation comprising generating a multi-dimensional color transformation for transformation of first color image data for a source device to second color image data for a destination device, and applying constraints to the multi-dimensional color transformation to improve halftone dot integrity between the first color image data and the second color image data.

Other advantages, features, and embodiments of the present invention will become apparent from the following detailed description and claims.

BRIEF DESCRIPTION OF THE DRAWINGS

Like reference numbers and designations in the various drawings indicate like elements.

DETAILED DESCRIPTION

Figure 1:
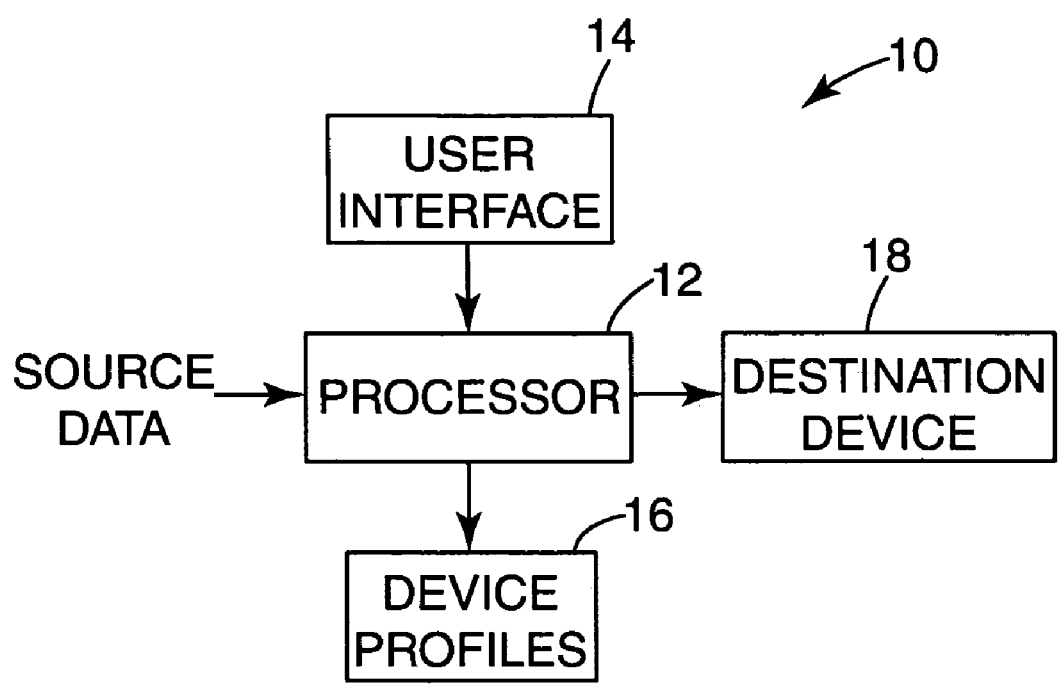
FIG. 1 is a block diagram illustrating a system for implementation of a constrained multi-dimensional color transformation function.

FIG. 1 is a block diagram illustrating a system 10 for implementation of a constrained multi-dimensional color transformation function. As shown in FIG. 1, system 10 may include a processor 12, a user interface 14, a memory 16 storing device profiles, and a destination device 18 for reproduction of a color image. Processor 12 may take the form of a general purpose microprocessor and can be integrated with or form part of a PC, Macintosh, or computer workstation. User interface 14 may include a conventional keyboard and pointing device such as a mouse or trackball, if desired. User interface 14 also may include a computer monitor, such as a CRT or flat panel display, that provides textual and/or graphic feedback to the user. Memory 16 may include random access memory (RAM) storing program code that is accessed and executed by processor 12. The program code can be loaded into memory 14 from another memory device, such as a read only memory (ROM), a fixed hard drive, or a removable media device associated with system 10. In particular, the program code can be initially carried on computer-readable media such as magnetic, optical, magneto-optic or other disk or tape media. Alternatively, the program code can be carried on electronic computer-readable media such as EEPROM.

In operation, processor 12 receives source data representative of color image data for a source device, and retrieves device profiles corresponding to the source device and the destination device from memory 16. The device profiles characterize the color responses of the source device and destination device 18. In particular, the device profiles may include forward models that convert respective device-dependent coordinates associated with the source and destination device, e.g., CMYK, to a device-independent color space, e.g., L*a*b*. Based on the device profiles retrieved from memory 16, processor 12 formulates a multi-dimensional color transformation function for accurate color matching between the source and destination devices. The transformation ordinarily is applied to the source image data prior to application of halftone screening. The transformation function may take the form of a multi-dimensional lookup table (LUT), mathematical equations, or a combination of both. Processor 12 applies the color transformation function to the source data to produce destination data that drives destination device 18 to produce a more accurate visual match to the output of the source device.

Figure 2:
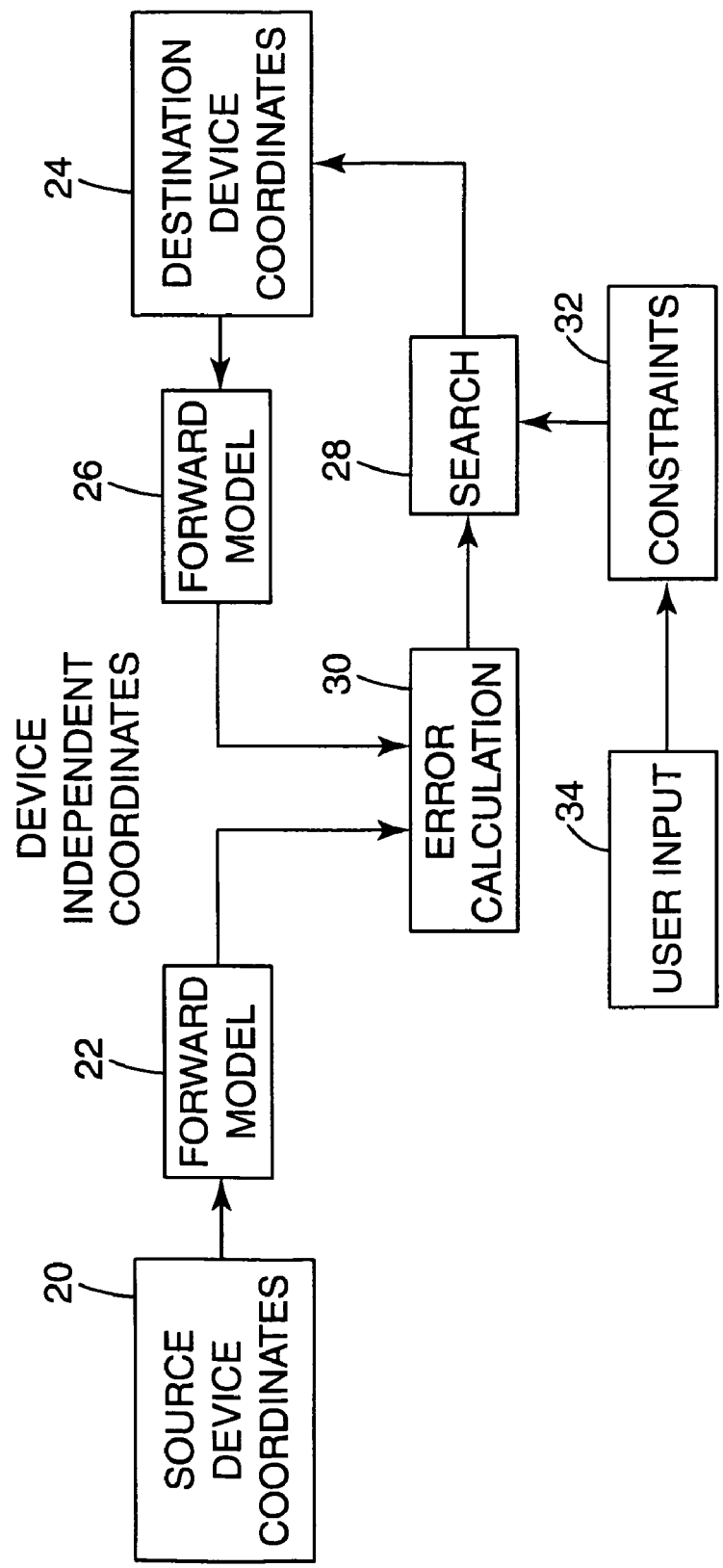
FIG. 2 is a block diagram illustrating a method for formulation of a constrained multi-dimensional color transformation function.

FIG. 2 is a block diagram illustrating a method for formulation of a constrained multi-dimensional color transformation function. As shown in FIG. 2, given a set of source data in source device-dependent coordinates, indicated by reference numeral 20, processor 12 applies a forward model 22 to convert the values to a device-independent color space. The forward model may convert device-dependent coordinates such as CMYK data, for example, to device-independent coordinates such as CIE L*a*b* data. To produce destination data in destination device-dependent coordinates, e.g., CMYK, processor 12 performs a search of destination device-dependent coordinates that, when applied to the forward model for the destination device, approximate the device-independent coordinates generated for the source data. Again, the device-independent coordinates may be, for example, CIE L*a*b* data. With further reference to FIG. 2, destination device coordinates 24 are applied to destination device forward model 26 to produce the device-independent coordinates.

A search module 28 executed by processor 12 governs the search for matching coordinates. Search module 28 selects a set of starting destination device coordinates, and then monitors the resulting error calculated between the device-independent coordinates for the source device and those for the destination device. If the error calculation, indicated by reference numeral 30, produces an unacceptable error, search module 28 seeks destination device coordinates that minimize the calculated error. The process continues in an iterative manner until the calculated error is reduced to an acceptable degree. When the error is sufficiently reduced, search engine 28 has found destination device coordinates necessary to produce a desired visual match with the source device coordinates. On this basis, processor 12 generates the M-D color transformation function that is applied to transform source device color data to destination device color data.

If the search is unconstrained, the destination device coordinates may produce an acceptable visual match, but lack dot integrity. For this reason, search module 28 is subject to a set of constraints 32. The constraints 32 can be specified by user input 34 or by reference to predetermined default constraints applicable to particular source and destination devices. The constraints 32 prevent the selection of destination device coordinates that would remove or add particular color information from the source device. In this manner, dot integrity is maintained while achieving high color match accuracy. Dot integrity can be a concern when diagnosing color problems in a source device such as a printing press.

In particular, the presence in a destination device proof of dots that would not be produced by the source, but which nevertheless provide an acceptable calorimetric match, can confound a press technician. In other words, the destination image may produce an acceptable calorimetric match, but incorporate or remove dots for a particular colorant in a manner different from the actual source device. To avoid this problem, constraints are applied that prevent addition or removal of selected dots. The formulation of constraints to provide a constrained M-D color transformation function (CMT) will now be described in greater detail.

To determine the optimal color transformation between two devices, a calorimetric model of each device is required. Colorimetric models specify the relationship between device-specific color coordinates, e.g., CMYK, and a device-independent color representation such as reflectance spectra or CIE L*a*b* values. This relationship can be expressed as a multi-dimensional lookup table (LUT), as mathematical equations, or as a combination of the two. An International Color Consortium (ICC) profile, for example, uses either a LUT-based or equation-based representation to convert from device-dependent coordinates to device-independent coordinates, referred to as a Profile Connecting Space (PCS). This is often referred to as the forward model for the device. ICC profiles also contain an inverse model governing transformation from the PCS back to device coordinates for a specific set of conditions such as gamut mapping, total ink limits, gray component replacement (GCR), under color removal (UCR), etc. Use of the inverse model, however, is not necessary for application of the CMT.

Instead, as illustrated in FIG. 2, the CMT makes use of the forward model of the source device to determine the device-independent color, followed by a constrained search of the forward model for the destination device to find an optimal match in the color space of the destination device. In this manner, the constraints are embedded in the resultant transformation. In other words, the transformation is generated based in part on the constraints. The transformation typically is applied before halftone screening of the image. For a CMYK source to CMYK destination transformation, the K versus CMY tradeoff can be constrained by maintaining the integrity of the black channel or through a gray component replacement (GCR)-type relationship. In this manner, a one-to-one mapping from source CMYK to destination CMYK can be achieved in the transformation. Without constraints, it is possible to have two nearly identical colors, as defined in the PCS, map to very different device coordinates, resulting in image artifacts.

In addition to constraints that ensure a one-to-one mapping, further constraints can be applied to limit the device-dependent colors to realizable values such that it is impossible to produce less than 0% or greater than 100% of a given colorant. One way of visualizing this type of constraint is to think of an n-dimensional hypercube ("box"), with each dimension representing a device color channel ranging from 0% to 100%. The solution must be contained within the defined box. These constraints ensure physically realizable results, but do not prevent the transformation from accessing any specific region of the destination color space. As such, a color transformation that only uses these box constraints is often referred to as "unconstrained."

Figure 3:
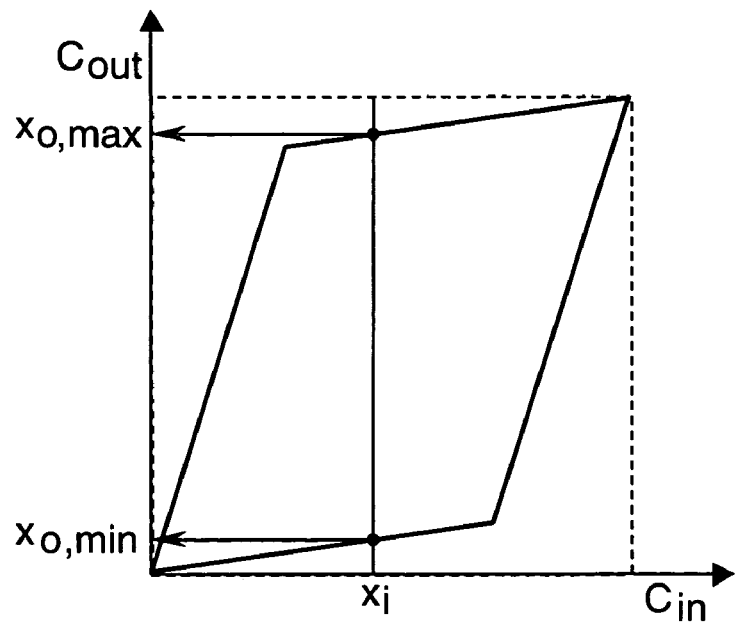
FIG. 3 is a diagram of a constraint region within a color space.

The unconstrained M-D transform is constrained only by the physical limits of the device. If the constraints on the output colorants are generalized to be functions of the input colorants rather than constant ("box") values, a dot-preserving type of CMT can be achieved. FIG. 3 illustrates a simple constraint function on a single colorant, cyan (C). In this case, the square region bounded by the dashed line and the $C_{in}$ and $C_{out}$ axes represents the full 0% to 100% range ("box") of the input and output colorants. Gray regions are excluded from the search domain and the white center portion is the valid region for the colorant. Consequently, the transformation produced by the search excludes the gray region. The gray along the $C_{out}$ axis, therefore, represents the constraint "do not add the colorant if it does not exist in the source," while gray along the $C_{in}$ axis represents "do not remove a colorant if it does exist in the source."

For example, if there is no colorant in the source ($C_{in}$=0%), then the constraints limit the output to $C_{out}$=0%. If $C_{in}$=50%, $C_{out}$ could range from the lower to upper bold lines, which could be at 0% and 100%, respectively, even though that is not what is shown in the example region of FIG. 3. The lower limit ensures that if a given colorant exists, it is not completely removed to obtain a color match. The upper limit increases from zero to allow a smooth transition from the region where the destination colorant cannot be added (i.e., $C_{in}$=0%) to where it can be varied significantly to obtain a color match.

Thus, for digitally addressed printing devices, there are simple bound constraints on the input and output digital values ($C_{in}$ and $C_{out}$, respectively), which correspond to the limits on the digital representation of the colorant amount. In the constraint region of FIG. 3, simple bound constraints are represented, for a single colorant channel, by dashed square 36. For N colorant channels, simple bound constraints illustrated by square 36 define an N-dimensional hypercube of the addressable color values for the respective device. When determining the destination device coordinates that provide a color match for the color rendered by the source device with a given set of input (or source) device coordinates, the matching process may select from any of the destination coordinates within this hypercube.

In a constrained matching process, selected volumes within the hypercube are excluded from consideration during the search. For example, if the source device coordinate value for one channel were $C_{in}$=$x_i$, then using the example constraint boundaries in FIG. 3 the coordinate values of the destination device would be limited to the range [$x_{o,min}$, $x_{o,max}$]. These limits to the allowable range are determined by the extent of the permissible region, defined by boundary 38 and shown in white in FIG. 3, along a vertical line at $C_{in}$=$x_i$, as demonstrated above. Similar constraints applied to other channels result in a sub-volume of the original hypercube defining the new range of destination coordinates allowed when searching for matching coordinate values according to a process as shown in FIG. 2.

These constraint regions can be applied in the general case on a colorant-by-colorant basis. More typically, a few specific constraint conditions are particularly useful in CMYK to CMYK matching. Exemplary constraint conditions are:

(1) Full multi-dimensional. In this case, the search process is allowed to use device coordinates throughout the full 0% to 100% box. This constraint condition provides the benefits of full multi-dimensional transformation, but may suffer from reduced dot integrity.

(2) Do not add or remove colorants. In this case, the search process applies constraint regions such as those shown in FIG. 3 to all colorants.

(3) Do not add or remove black. In this case, the search process applies the constraint only to the K channel for CMYK.

(4) Do not add or remove chromatic colorants. In this case, the search process applies the constraint to CMY but not K. The constraint condition also may be applied to subsets of the chromatic colorants. The chromatic colorants may include, in addition to CMY, other colorants used in the applicable process.

In addition, the "do not add" and "do not remove" constraints can be individually applied to the above conditions. This would correspond to removal of the upper or lower gray region of FIG. 3 for given colorants.

As a further option, particular constraint conditions can be selected in combination to achieve specific results. To better maintain black channel purity, for example, it may be desirable to combine "full multi-dimensional" and "do not add chromatic colorants" constraint conditions. Image elements such as text or line art typically use only the black channel to achieve sharpness and avoid misregistration effects. Other elements such as drop-shadows often use only the black channel to minimize hue shifts as the output device drifts.

When a region of the source image contemplates the printing of a single-color black, i.e., when only the K channel is specified, the "do not add chromatic colorants" constraint is applied. The use of single-color black is prevalent for text. When there is no single-color black in the source image, the "full multi-dimensional" constraint condition is applied. A smooth transition can be provided for imagery with content spanning between the two constraint conditions, i.e., black only and no single-color black. This approach could be seen as defining constraint functions for a plurality of colorants, rather than just the specific colorant to be constrained.

A smooth transition can be implemented, for example, by interpolating between the constrained and unconstrained cases. One specific implementation can be described by defining a function HighLimitFunction(x) as the upper constraint limit for the "do not add chromatic colorants" constraint condition, which is presented by the upper bold-line function in FIG. 3. In this case, the interpolation between the "black only" and "no single-color black" cases could be represented as follows:

$hlfm$=HighLimitFunction (Max($C, M, Y$)), $hlfk$=HighLimitFunction ($K$), $C$max=$(1.0-hlfk)*hlfm+hlfk*$HighLimitFunction($C_{in}$), $M$max=$(1.0-hlfk)*hlfm+hlfk*$HighLimitFunction ($M_{in}$), $Y$max=$(1.0-hlfk)*hlfm+hlfk*$HighLimitFunction($Y_{in}$), where ($C_{max}, M_{max}, Y_{max}$) are the upper constraint limits for the color ($C_{in}, M_{in}, Y_{in}$) hlfm represents the upper constraint limit function based on the maximum of the chromatic colors, and hlfk represents the upper constraint limit function for K. Other interpolation functions could be used without significantly altering the methodology described above. Furthermore, this methodology may be applied to other color sets such as high fidelity color or custom color sets.

Although the examples described herein focus on application to CMYK matching, the CMT is not limited to only that color space. For example, these constraints can be applied for RGB to RGB mapping where the polarity of 0% and 100% colorants may be reversed. In this case, the "Do not add or remove colorants" and "Do not add or remove chromatic colorants" constraints are equivalent, and the "Do not add or remove black" does not apply. Further, this same methodology can be applied to other color sets such as Hi-Fi color, e.g., five or more colors, or custom color sets. Some color sets use as many as seven and sometimes eight different colors.

Also, the specific shape of the upper and lower constraint limits can be different than those shown in FIG. 3. For example, it may be desirable to utilize functions that maintain continuity of slope as well as continuity of function value, rather than piecewise linear functions. Specific device characteristics may also determine the best constraint function. For example, if a specific halftone device cannot maintain a dot below 2%, the function could maintain the lower limit above 2% over most of the region, and taper down to 0% only near the origin.

Users of high-resolution digital halftone proofers typically desire proofs having both dot-integrity and excellent color fidelity with respect to the proofing target, e.g., a press sheet. One-dimensional correction functions provide dot integrity but less color fidelity. Unconstrained multi-dimensional transforms, such as are typical of ICC device link profiles, can provide excellent color fidelity but may add or remove dots with respect to the proofing target. By imposing constraints on a multi-dimensional correction, it is possible to vary the size of only the dots that are present, just like the 1-D corrections, but optimize the size variations for each region of color space.

A dot-preserving multi-dimensional transform represents the best of both 1-D and unconstrained M-D transforms with potentially minimal reductions in color accuracy. These dot-preserving color transformations may also be used to make multiple presses in distributed print locations conform to a particular color specification, e.g., TR001. The TR001 standard is represented in ANSI CGATS.6-1995: "Graphic technology-Specifications for graphic arts printing-Type 1," the entire content of which is incorporated herein by reference. Indeed, the use of multi-dimensional transforms has been avoided in the past when mapping to press for loss of dot-integrity reasons as described above.

EXAMPLE 1

The following example illustrates the application of constraints to a multi-dimensional color transformation technique in accordance with an embodiment of the present invention. In this example, a CMT as described herein was integrated within an Imation® Color Fidelity Module (Imation Corp., Oakdale, Minn.), which is an ICC and Apple ColorSync-compliant color-matching module for the Apple Macintosh operating system. A number of device links, with various constraints imposed, were generated using a TR001 CMYK source (target) profile and Imation Matchprint™ Laserproof on Publication base as the destination profile. The TR001 ICC profile was constructed from the averaged spectral values from an IT8-7/3 extended target, which are published in the TR001 standard. The Matchprint™ Laserproof ICC profile was created from an Imation SpectralProfiler model file.

Figure 4:
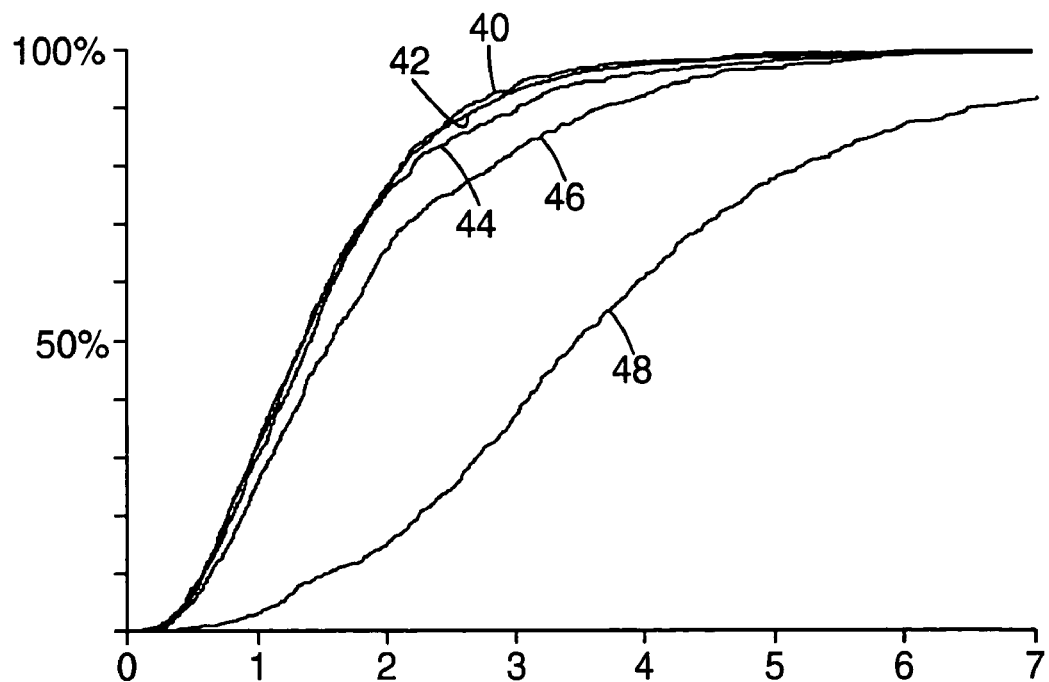
FIG. 4 is a graph of comparative color error cumulative histograms for various color transformation techniques.

The device link constraint methods included: (a) do not add or remove CMYK, (b) do not add or remove K, (c) do not add or remove CMY, and (d) no constraints (full color mixing allowed). Proofs of the IT8-7/3 extended target, with 928 patches, were prepared using each of these constraint methods. For comparison, a fifth proof using one-dimensional corrections (optimized for the TR001 target) was also prepared. Cumulative histograms of the color errors for all five proofs are shown in FIG. 4. In FIG. 4, reference numeral 40 denotes unconstrained M-D, reference numeral 42 denotes the "do not add or remove CMY" M-D (option (c) above), reference numeral 44 denotes the "do not remove K" M-D (option (b) above), reference numeral 46 denotes the fully constrained "do not add or remove CMYK" M-D (option (a) above), and reference numeral 48 denotes a 1-D transformation. As one would expect, the constrained M-D histograms are bounded by the unconstrained M-D histogram on the left and the 1-D histogram on the right. The most striking feature of this graph is that the fully-constrained M-D transform (option (a) above) performs almost as well as the unconstrained M-D transform, indicating that it indeed does provide both excellent color fidelity and dot integrity.

EXAMPLE 2

The following example illustrates the application of a combination of constraints to a multi-dimensional color transformation technique, in accordance with another embodiment of the present invention, to better maintain black channel purity. In this example, a CMT as described herein was integrated within an Imation® Color Fidelity Module (Imation Corp., Oakdale, Minn.), which is an ICC and Apple ColorSync-compliant color-matching module for the Apple Macintosh operating system.

A transformation was made between a SWOP proof condition and a particular press, relying on forward profiles generated for each of them. In this case, using an unconstrained mapping while maintaining overall calorimetric integrity as described herein, a source color of CMYK=(0%, 0%, 0%, 100%) was transformed to (32%, 9%, 0%, 97%). Thus, the press black was reddish, with the cyan and magenta being added to provide an exact color match. Using a combination of the "full multi-dimensional" and "do not add chromatic colorants" constraint conditions, the same source color was transformed to (0%, 0%, 0%, 98%), thereby preserving black channel purity, and dot integrity.

Another transformation was made between a SWOP proof condition and an Imation 4700 color proofer (Imation Corp., Oakdale, Minn.), relying on forward profiles generated for each of them. In this case, an unconstrained mapping while maintaining overall colorimetric integrity as described herein resulted in transformation of a source color of CMYK=(0%, 0%, 0%, 100%) to (0%, 18%, 31%, 93%). Thus, the 4700 black was bluish, with magenta and yellow being added to provide an exact color match. Applying a combination of the "full multi-dimensional" and "do not add chromatic colorants" constraint conditions, the same source color was transformed to (0%, 0%, 0%, 95%). Again, black channel purity was achieved, e.g., providing preservation of sharpness and hue consistency for text, shadows, and the like.

The foregoing detailed description has been provided for a better understanding of the invention and is for exemplary purposes only. Modifications may be apparent to those skilled in the art without deviating from the spirit and scope of the appended claims.

What is claimed is:

1. A method for multi-dimensional color transformation comprising:
   (a) applying a multi-dimensional color transformation for transformation of source device-dependent coordinates to destination device-dependent coordinates, wherein the source device-dependent coordinates and destination device-dependent coordinates have, at least in part, a common coordinate system; and
   (b) constraining the destination device-dependent coordinates produced by the multi-dimensional color transformation to prevent removal of selected colorants specified by the source device-dependent coordinates.

2. The method of claim 1, wherein the multi-dimensional color transformation is configured based on the constraints imposed in step (b).

3. The method of claim 1, wherein step (b) includes constraining the destination device-dependent coordinates produced by the multi-dimensional color transformation to prevent removal of selected colorants present at corresponding dots specified by the source device-dependent coordinates.

4. The method of claim 1, wherein step (b) includes constraining the destination device-dependent coordinates produced by the multi-dimensional color transformation to prevent removal of black colorant present at corresponding dots specified by the source device-dependent coordinates.

5. The method of claim 1, wherein step (b) includes constraining the destination device-dependent coordinates produced by the multi-dimensional color transformation to prevent removal of one or more chromatic colorants present at corresponding dots specified by the source device-dependent coordinates.

6. The method of claim 1, further comprising:
   (c) constraining the destination device-dependent coordinates produced by the multi-dimensional color transformation to prevent introduction of selected colorants not specified by the source device-dependent coordinates.

7. The method of claim 6, wherein step (c) includes constraining the destination device-dependent coordinates produced by the multi-dimensional color transformation to prevent addition of selected colorants not present at corresponding dots specified by the source device-dependent coordinates.

8. The method of claim 6, wherein step (c) includes constraining the destination device-dependent coordinates produced by the multi-dimensional color transformation to prevent addition of black colorant not present at corresponding dots specified by the source device-dependent coordinates.

9. The method of claim 6, wherein step (c) includes constraining the destination device-dependent coordinates produced by the multi-dimensional color transformation to prevent addition of one or more chromatic colorants not present at corresponding dots specified by the source device-dependent coordinates.

10. The method of claim 6, wherein step (c) includes constraining the destination device-dependent coordinates produced by the multi-dimensional color transformation to prevent addition of chromatic colorants for black-only dots specified by the source device-dependent coordinates.

11. The method of claim 6, further comprising constraining the destination device-dependent coordinates produced by the multi-dimensional color transformation in at least one of steps (b) and (c) based at least in part on constraints specified by a user.

12. The method of claim 1, wherein each of the source device-dependent coordinates and destination device-dependent coordinates is defined by cyan, magenta, yellow, and black (CMYK) colorants.

13. A method for multi-dimensional color transformation comprising:
(a) generating a multi-dimensional color transformation for transformation of a source device-dependent coordinates to a destination device-dependent coordinates, wherein the source device-dependent coordinates and destination device-dependent coordinates have, at least in part, a common coordinate system; and
(b) constraining the destination device-dependent coordinates produced by the multi-dimensional color transformation to prevent introduction of selected colorants not specified by the source device-dependent coordinates.

14. The method of claim 13, wherein the multi-dimensional color transformation is configured based on the constraints imposed in step (b).

15. The method of claim 13, wherein step (b) includes constraining the destination device-dependent coordinates produced by the multi-dimensional color transformation to prevent addition of selected colorants not present at corresponding dots specified by the source device-dependent coordinates.

16. The method of claim 13, wherein step (b) includes constraining the destination device-dependent coordinates produced by the multi-dimensional color transformation to prevent addition of black colorant not present at corresponding dots specified by the source device-dependent coordinates.

17. The method of claim 13, wherein step (b) includes constraining the destination device-dependent coordinates produced by the multi-dimensional color transformation to prevent addition of one or more chromatic colorants not present at corresponding dots specified by the source device-dependent coordinates.

18. The method of claim 13, wherein step (b) includes constraining the destination device-dependent coordinates produced by the multi-dimensional color transformation to prevent addition of chromatic colorants for black-only dots specified by the source device-dependent coordinates.

19. The method of claim 13, wherein each of the source device-dependent coordinates and destination device-dependent coordinates is defined by cyan, magenta, yellow, and black (CMYK) colorants.

20. A system for multi-dimensional color transformation comprising:
a processor that generates a multi-dimensional color transformation for transformation of a source device-dependent coordinates to destination device-dependent coordinates, wherein the source device-dependent coordinates and destination device-dependent coordinates have, at least in part, a common coordinate system, and
a memory that stores constraints,
wherein the processor is programmed to apply the constraints to constrain the destination device-dependent coordinates produced by the multi-dimensional color transformation to prevent removal of selected colorants specified by the source device-dependent coordinates.

21. The system of claim 20, wherein the multi-dimensional color transformation is configured based on the constraints applied by the processor.

22. The system of claim 20, wherein the processor constrains the destination device-dependent coordinates produced by the multi-dimensional color transformation to prevent removal of selected colorants present at corresponding dots specified by the source device-dependent coordinates.

23. The system of claim 20, wherein the processor constrains the destination device-dependent coordinates produced by the multi-dimensional color transformation to prevent removal of black colorant present at corresponding dots specified by the source device-dependent coordinates.

24. The system of claim 20, wherein the processor constrains the destination device-dependent coordinates produced by the multi-dimensional color transformation to prevent removal of one or more chromatic colorants present at corresponding dots specified by the source device-dependent coordinates.

25. The system of claim 20, wherein the processor is further programmed to constrain the destination device-dependent coordinates produced by the multi-dimensional color transformation to prevent introduction of selected colorants not present specified by the source device-dependent coordinates.

26. The system of claim 25, wherein the processor constrains the destination device-dependent coordinates produced by the multi-dimensional color transformation to prevent addition of selected colorants not present at corresponding dots specified by the source device-dependent coordinates.

27. The system of claim 25, wherein the processor constrains the destination device-dependent coordinates produced by the multi-dimensional color transformation to prevent addition of black colorant not present at corresponding dots specified by the source device-dependent coordinates.

28. The system of claim 25, wherein the processor constrains the destination device-dependent coordinates produced by the multi-dimensional color transformation to prevent addition of one or more chromatic colorants not present at corresponding dots specified by the source device-dependent coordinates.

29. The system of claim 25, wherein the processor constrains the destination device-dependent coordinates produced by the multi-dimensional color transformation to prevent addition of chromatic colorants for black-only dots specified by the source device-dependent coordinates.

30. The system of claim 20, wherein each of the source device-dependent coordinates and destination device-dependent coordinates is defined by cyan, magenta, yellow, and black (CMYK) colorants.

31. A system for multi-dimensional color transformation comprising:
a processor that generates a multi-dimensional color transformation for transformation of a source device-dependent coordinates to a destination device-dependent coordinates, wherein the source device-dependent coordinates and destination device-dependent coordinates have, at least in part, a common coordinate system; and
a memory that stores constraints,
wherein the processor is programmed to apply the constraints to constrain the destination device-dependent coordinates produced by the multi-dimensional color transformation to prevent introduction of selected colorants not specified by the source device-dependent coordinates.

32. The system of claim 31, wherein the multi-dimensional color transformation is configured based on the constraints applied by the processor.

33. The system of claim 31, wherein the processor constrains the destination device-dependent coordinates produced by the multi-dimensional color transformation to prevent addition of selected colorants not present at corresponding dots specified by the source device-dependent coordinates.

34. The system of claim 31, wherein the processor constrains the destination device-dependent coordinates produced by the multi-dimensional color transformation to prevent addition of black colorant not present at corresponding dots specified by the source device-dependent coordinates.

35. The system of claim 31, wherein the processor constrains the destination device-dependent coordinates produced by the multi-dimensional color transformation to prevent addition of one or more chromatic colorants not present at corresponding dots specified by the source device-dependent coordinates.

36. The system of claim 31, wherein the processor constrains the destination device-dependent coordinates produced by the multi-dimensional color transformation to prevent addition of chromatic colorants for black-only dots specified by the source device-dependent coordinates.

37. The system of claim 31, wherein each of the source device-dependent coordinates and destination device-dependent coordinates is defined by cyan, magenta, yellow, and black (CMYK) colorants.

38. A computer-readable medium containing program code that when executed by a processor:
   (a) generates a multi-dimensional color transformation for transformation of source device-dependent coordinates to destination device-dependent coordinates, wherein the source device-dependent coordinates and destination device-dependent coordinates have, at least in part, a common coordinate system; and
   (b) constrains the destination device-dependent coordinates produced by the multi-dimensional color transformation to prevent removal of selected colorants specified by the source device-dependent coordinates.

39. The computer-readable medium of claim 38, wherein the multi-dimensional color transformation is configured based on the constraints imposed in step (b).

40. The computer-readable medium of claim 38, wherein step (b) includes constraining the destination device-dependent coordinates produced by the multi-dimensional color transformation to prevent removal of selected colorants present at corresponding dots specified by the source device-dependent coordinates.

41. The computer-readable medium of claim 38, wherein step (b) includes constraining the destination device-dependent coordinates produced by the multi-dimensional color transformation to prevent removal of black colorant present at corresponding dots specified by the source device-dependent coordinates.

42. The computer-readable medium of claim 38, wherein step (b) includes constraining the destination device-dependent coordinates produced by the multi-dimensional color transformation to prevent removal of one or more chromatic colorants present at corresponding dots specified by the source device-dependent coordinates.

43. The computer-readable medium of claim 38, wherein the program code is configured such that, when executed, the processor:
   (c) constrains the destination device-dependent coordinates produced by the multi-dimensional color transformation to prevent introduction of selected colorants not specified by the source device-dependent coordinates.

44. The computer-readable medium of claim 43, wherein step (c) includes constraining the destination device-dependent coordinates produced by the multi-dimensional color transformation to prevent addition of selected colorants not present at corresponding dots specified by the source device-dependent coordinates.

45. The computer-readable medium of claim 43, wherein step (c) includes constraining the destination device-dependent coordinates produced by the multi-dimensional color transformation to prevent addition of black colorant not present at corresponding dots specified by the source device-dependent coordinates.

46. The computer-readable medium of claim 43, wherein step (c) includes constraining the destination device-dependent coordinates produced by the multi-dimensional color transformation to prevent addition of one or more chromatic colorants not present at corresponding dots specified by the source device-dependent coordinates.

47. The computer-readable medium of claim 43, wherein step (c) includes constraining the destination device-dependent coordinates produced by the multi-dimensional color transformation to prevent addition of chromatic colorants for black-only dots specified by the source device-dependent coordinates.

48. The computer-readable medium of claim 43, wherein the program code is configured such that, when executed, the processor constrains the destination device-dependent coordinates produced by the multi-dimensional color transformation in at least one of steps (b) and (c) based at least in part on constraints specified by a user.

49. The computer-readable medium of claim 38, wherein each of the source device-dependent coordinates and destination device-dependent coordinates is defined by cyan, magenta, yellow, and black (CMYK) colorants.

50. A computer-readable medium containing program code that when executed by a processor:
   (a) generates a multi-dimensional color transformation for transformation of source device-dependent coordinates to destination device-dependent coordinates, wherein the source device-dependent coordinates and destination device-dependent coordinates have, at least in part, a common coordinate system; and
   (b) constrains the destination device-dependent coordinates produced by the multi-dimensional color transformation to prevent introduction of selected colorants not specified by the source device-dependent coordinates.

51. The computer-readable medium of claim 50, wherein the multi-dimensional color transformation is configured based on the constraints imposed in step (b).

52. The computer-readable medium of claim 50, wherein step (b) includes constraining the destination device-dependent coordinates produced by the multi-dimensional color transformation to prevent addition of selected colorants not present at corresponding dots specified by the source device-dependent coordinates.

53. The computer-readable medium of claim 50, wherein step (b) includes constraining the destination device-dependent coordinates produced by the multi-dimensional color transformation to prevent addition of black colorant not present at corresponding dots specified by the source device-dependent coordinates.

54. The computer-readable medium of claim 50, wherein step (b) includes constraining the destination device-dependent coordinates produced by the multi-dimensional color transformation to prevent addition of one or more chromatic colorants not present at corresponding dots specified by the source device-dependent coordinates.

55. The computer-readable medium of claim 50, wherein step (b) includes constraining the destination device-dependent coordinates produced by the multi-dimensional color transformation to prevent addition of chromatic colorants for black-only dots specified by the source device-dependent coordinates.

56. The computer-readable medium of claim 50, wherein each of the source device-dependent coordinates and destination device-dependent coordinates is defined by cyan, magenta, yellow, and black (CMYK) colorants.

57. A method for multi-dimensional color transformation comprising:
applying a multi-dimensional color transformation for transformation of source device-dependent coordinates to destination device-dependent coordinates, wherein the source device-dependent coordinates and destination device-dependent coordinates have, at least in part, a common coordinate system; and
constraining the destination device-dependent coordinates to a range of matching destination device-dependent coordinates searched by the multi-dimensional color transformation as a function of the source device-dependent coordinates to prevent substitution for colorants specified by the source device-dependent coordinates.

58. The method of claim 57, wherein constraining includes constraining the destination device-dependent coordinates in the multi-dimensional color transformation to prevent removal of selected colorants specified by the source device-dependent coordinates.

59. The method of claim 57, wherein constraining includes constraining the destination device-dependent coordinates in the multi-dimensional color transformation to prevent removal of selected colorants present at corresponding dots specified by the source device-dependent coordinates.

60. The method of claim 57, wherein constraining includes constraining the destination device-dependent coordinates in the multi-dimensional color transformation to prevent removal of black colorant present at corresponding dots specified by the source device-dependent coordinates.

61. The method of claim 57, wherein constraining includes constraining the destination device-dependent coordinates in the multi-dimensional color transformation to prevent removal of one or more chromatic colorants present at corresponding dots specified by the source device-dependent coordinates.

62. The method of claim 57, wherein constraining includes constraining the destination device-dependent coordinates in the multi-dimensional color transformation to prevent introduction of selected colorants not specified by the source device-dependent coordinates.

63. The method of claim 57, wherein constraining includes constraining the destination device-dependent coordinates in the multi-dimensional color transformation to prevent addition of selected colorants not present at corresponding dots specified by the source device-dependent coordinates.

64. The method of claim 57, wherein constraining includes constraining the destination device-dependent coordinates in the multi-dimensional color transformation to prevent addition of black colorant not present at corresponding dots specified by the source device-dependent coordinates.

65. The method of claim 57, wherein step (b) includes constraining the destination device-dependent coordinates in the multi-dimensional color transformation to prevent addition of one or more chromatic colorants not present at corresponding dots specified by the source device-dependent coordinates.

66. The method of claim 57, wherein step (b) includes constraining the destination device-dependent coordinates in the multi-dimensional color transformation to prevent addition of chromatic colorants for black-only dots specified by the source device-dependent coordinates.

\* \* \* \* \*